(12) United States Patent
Eichenberger et al.

(10) Patent No.: US 7,206,923 B2
(45) Date of Patent: Apr. 17, 2007

(54) METHOD AND APPARATUS FOR ELIMINATING THE NEED FOR REGISTER ASSIGNMENT, ALLOCATION, SPILLING AND RE-FILLING

(75) Inventors: Alexandre E. Eichenberger, Chappaqua, NY (US); Erik R. Altman, Danbury, CT (US); Sumedh W. Sathaye, LaGrangeville, NY (US); John-David Wellman, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 360 days.

(21) Appl. No.: 10/735,054

(22) Filed: Dec. 12, 2003

(65) Prior Publication Data

US 2005/0132172 A1 Jun. 16, 2005

(51) Int. Cl.
*G06F 12/00* (2006.01)
*G06F 9/38* (2006.01)

(52) U.S. Cl. .................................................... 712/217
(58) Field of Classification Search ................ 712/217, 712/216
See application file for complete search history.

(56) References Cited

U.S. PATENT DOCUMENTS

| | | | | |
|---|---|---|---|---|
| 5,901,316 A | * | 5/1999 | Goebel | 717/158 |
| 5,946,491 A | * | 8/1999 | Aizikowitz et al. | 717/158 |
| 6,090,156 A | * | 7/2000 | MacLeod | 717/157 |
| 6,314,513 B1 | * | 11/2001 | Ross et al. | 712/228 |
| 6,487,630 B2 | * | 11/2002 | Bui | 711/109 |
| 6,523,173 B1 | * | 2/2003 | Bergner et al. | 717/152 |
| 6,526,572 B1 | * | 2/2003 | Brauch et al. | 717/154 |
| 6,631,452 B1 | * | 10/2003 | Lin | 711/159 |
| 6,925,639 B2 | * | 8/2005 | Tarditi | 717/159 |
| 6,938,149 B2 | * | 8/2005 | Kunimatsu et al. | 712/217 |

OTHER PUBLICATIONS

Kiyohara et al., "Register Connection: A New Approach to Adding Registers into Instructions Set Architectures", May 17-19, 1993, pp. 1-10, The Symposium on Computer Architure, San Diego, CA.

\* cited by examiner

*Primary Examiner*—Eric Coleman
(74) *Attorney, Agent, or Firm*—Harrington & Smith, LLP

(57) ABSTRACT

A method and apparatus is provided to manage data in computer registers in a program, making more computer registers available to one or more programmers utilizing a name level instruction. The method and apparatus disclosed herein presents a way of reducing the overhead of register management, by introducing a concept of a name level for each of the named architected registers in a processor. The method provides a programmer with a larger register namespace while not increasing the size of the instruction word in the processor instruction-set architecture. It also provides for the facilitation of architectural features which overload the architected register namespace and ease the overhead of register management. This provides for the addition of more computer registers without changing the instruction format of the computer.

22 Claims, 6 Drawing Sheets

Prior Art

Prior Art

Fig. 3

```
..........
..........
Load R1 = A
Load R2 = B
; Use R1
..........; ran out of registers
Spill R1 back to location A
Load R1 = C
R2 = R2 + R1 ; B=B+C
..........
..........
Spill R1 to location C
Load R1 =  A
R2 = R2 * R1 ; B=B*A
..........
..........
```

Fig. 4

```
; nameLev R1, 0 is implicit
..........
..........
Load R1 = A ; first instance of R1
Load R2 = B
; use R1
..........
; ran out of registers
nameLev R1,1    ; R1 means "second instance" of R1
Load R1 = C ; second instance of R1
R2 = R2 + R1; second instance of R1
..........
..........
nameLev R1, 0   ; R1 means "first instance" of R1
R2 = R2 * R1; first instance of R1
..........
..........
```

METHOD AND APPARATUS FOR ELIMINATING THE NEED FOR REGISTER ASSIGNMENT, ALLOCATION, SPILLING AND RE-FILLING

TECHNICAL FIELD

These teachings relate generally to computer systems, and more specifically relate to the management of computer registers in a program, by providing a programmer with a larger register name-space while not increasing the size of the instruction word in the processor instruction-set architecture.

BACKGROUND

Contemporary data processor architectures describe the programmer's view of a processor in an implementation independent manner. The three main parts of a processor generally covered by a processor architecture definition are: (1) the instruction-set, (2) the architectural state, and (3) the storage. The instruction-set makes use of the architectural state to perform the functions specified therein. The definition of the storage model describes to the programmer the model of storage access from a program or from single or multiple processors. Of the various components of the architectural state, registers generally refer to the programmer-managed near-distance storage elements that are directly used in the process of computation. For example, the instruction:

might specify that the contents of a storage location named R2 are added to the storage location R3, and the results are stored in storage location R1. It is expected that the location R1, R2, R3 are near-distance storage, often having the lowest latency of access in the entire system.

The registers are managed entirely by the programmer. The programmer chooses which parts of program data are to be held in registers and the point in time during execution that the data must appear in a given register. The method by which a programmer makes this decision is called register assignment. When a sequence of computations using a subset of registers is completed and the data held in the registers is no longer required for the subsequent steps in the computation, the programmer often stores the data back to more distant storage locations for the data elements, and re-uses the registers to hold other data elements to be used in future steps of computation. Sometimes the computation demands more registers than the machine architecture has provided to the programmer. When such a situation arises, the programmer must select a subset of registers to be stored back into a temporary holding area in storage. This temporary holding area generally requires a longer latency to access than registers. This temporary holding area is referred to as the spill area, and is typically on the procedure call/return stack. This process is referred to as "spilling". It is usually advisable to spill a register that is least likely to be used in a computation in the near future. The register, contents of which are now spilled to the spill area, is used to hold the results of another computation immediately at hand. When the immediate steps of computation are completed, the original data element is loaded back into the same register or some other register. This is referred to as the re-filling of a data element. The overall method of management of registers by a programmer is called register allocation. There exists a large body of literature, which details many algorithms, methods, and heuristics that assist the programmer in making decisions with regards to managing the available register space. While it is true that the programmer is the manager of register space, it is often the case that the compiler or a translator (such as an assembler, interpreter, virtual machine-code generator, a just-in-time compiler, a dynamic optimizer, or a link loader) is the software tool that manages the register space on behalf of the programmer, thereby freeing the programmer from having to deal with this problem. For this reason, when the term "programmer" is referred to herein, it is intended to cover the programmer code at the machine language level, or any software tool that generates code at the machine language level.

Often, the architectural specification restricts the programmer's view of a machine. Referring to FIG. 1, the programmer has a view of memory that is partitioned into spaces, with at least one space holding program instructions 120 and another holding program data 130, however, although shown separately, the program instructions 120 and the program data 130 may be part of the same memory address space. The processor has a single execution unit 125 and the registers 135. The model of execution is essentially the single instruction model, that is, one instruction is read from the instruction memory 120, the instruction specifies the operation to be performed on one or more registers 135, or to load/store data element(s) from/to the data memory 130. When the currently executing instruction finishes execution, the next instruction is read from instruction memory 120 and the execution continues until explicitly halted.

This simple model of execution which the architectural specification usually imposes on the programmer is far from reality in modern contemporary data processors. Contemporary high-performance data processors rely on superscalar, superpipelining, and/or very long instruction word (VLIW) techniques for exploiting instruction-level parallelism in programs; that is, for executing more than one instruction at a time. In general, these processors contain multiple functional units. They are able to execute a sequential stream of instructions, fetch from instruction memory more than one instruction per cycle, and dispatch for execution more than one instruction per cycle subject to dependencies and availability of resources.

The pool of instructions from which the processor selects those that are dispatched at a given point in time can be enlarged by the use of out-of-order execution. Out-of-order execution is a technique by which the operations in a sequential stream of instructions are reordered so that operations appearing later are executed earlier if the resources required by the operation are free, thus reducing the overall execution time of a program. Out-of-order execution exploits the availability of the multiple functional units by using resources that are otherwise idle. Reordering the execution of operations requires reordering the results produced by those operations, so that the functional behavior of the program is the same as what would be obtained if the instructions were executed in the original sequential order. In order to expose higher levels of instruction-level parallelism inherent in the program, modern processors often rename the registers. One particular case where this is extremely beneficial is when there are anti-dependencies and output-dependencies in the code. Anti-dependence is illustrated in the following example.

LOAD R3, mem0
ADD R1, R2, R3
LOAD R3, mem1

In this example, R3 is loaded from memory location mem0. At the ADD instruction, R3 is a source register. Following the completion of the ADD instruction, R3 is then loaded from memory address mem1. The anti-dependence occurs because the use of R3 as a source operand to the ADD instruction must occur before R3 is overwritten by the load from memory address mem1.

Modern day processors which employ renaming of registers could internally assign different names to the register named R3, as illustrated in the following sequence example.

LOAD r85, mem0
ADD r70, R2, r85
LOAD r86, mem1

In the new sequence, registers r70, r85 and r86 are internal, non-architected (i.e. invisible to the programmer) registers. As a result of renaming, the anti-dependence that existed in the original code sequence is broken; the ADD instruction is still data dependent on the first LOAD, but the second LOAD is independent of both of them and could potentially be executed in parallel. FIG. 2 shows this type of internal machine organization. An output-dependence occurs when the same architected register 245, is written by two different instructions. The simple process of renaming 240 could use different internal non-architected registers to represent the two targets that use the same architected register name, and then the instructions are data-independent of each other.

The limited view of the processor execution model that an architectural specification provides to the programmer allows the programmer to write code such that it is independent of the method of implementation and is still guaranteed to execute correctly. However, it also imposes restrictions on the programmer in terms of the architectural resources. Many programs are sufficiently complex that they would execute faster with a larger number of architectural resources such as registers. Yet, to meet the specifications imposed by the architecture, the programmer must introduce constructs such as register spilling and re-filling in the final machine code programs. Internally the machine may have more registers than the architecture conveyed to the programmer, but the programmer cannot take advantage of them. This leads to potential deterioration from possible levels of performance. Consider the segment of code written for a simple 2 register machine (for the sake of illustration) shown in FIG. 3.

There are two places in this sequence where the contents of register R1 are spilled to temporary storage and then brought back as needed. This results in pure overhead to manage the register usage, and is imposed by the architected limit of only 2 registers in this illustrative example. The cost of this restriction is borne on multiple fronts: the extra instructions to fill and spill (LOAD and STORE), the load/store execution resources (functional units), and the pollution in the data and instruction cache memories.

Relevant related prior approaches include the Sun SPARC™ architecture which uses register windowing (SPARC is a trademark owned by SPARC International, Inc., used under license by Sun Microsystems). This allows the programmer to allocate new registers for the purpose of parameter passing across procedure calls and returns. For example, a new window of registers is allocated when a programmer makes a register call. A portion of the window overlaps with the registers that were available in the caller procedure, and another portion of the window overlaps with the registers available in the callee procedure. The caller copies the values of parameters to be passed as input to the callee into its overlapped window, which appear so to the callee. The callee, in order to send the output values to the caller, copies the output to its part of the window, and the output values appear in the caller's windows as such. The size of the register window is fixed and at each procedure call and return the architecture imposes restrictions on the names that can be used by the caller and the callee to access the input/output parameter values respectively. This could be seen as a method to provide the programmer with extra registers, under implementation control, but without changing the encoding of the instructions that use them.

A similar register windowing scheme is used in the Intel® Itanium™ processor family architecture (Itanium is a trademark owned by Intel Corporation). The register windows in this scheme are also used for the purposes of passing input parameters and receiving output values, but the main difference is that the size of the register window is under programmer control. This reduces the burdens imposed by a pre-set size restriction by the architecture.

A simplistic method to extend the namespace could include the introduction of an entirely new instruction set (under the guise of an extension). Other architectures have addressed this problem by using longer format (width) instruction words to encode more registers. However, this approach invariably leads to unnecessary code size expansion in the programs and adversely impacts the performance of the system.

The IMPACT research group (University of Illinois) has published a method called register connection to extend the namespace available to the programmer. Register connection works as follows. An existing processor architecture specification is extended to include a new architected register file. A new set of instructions is added to the instruction-set. The new instructions allow the programmer to specify a "connection" between a register resource in the original architecture and a register in the newly defined architected register file. From that point on in the program, the processor implementation treats the register in the new file as the architected register for a given architected register name. When the programmer needs a new register, he simply reassigns ("connects") the architected register name to yet another new register. Thus, the extension scheme allows the programmer to explicitly manage the mapping between the old names and the new registers.

The register windowing scheme in the Sun SPARC™ architecture is not general. The window of registers is a fixed size. Further, the total number of extra registers that the scheme makes available to the programmer is also limited by the parameter passing requirements of a procedure call.

Similar constraints exist on the register windowing scheme in the Intel® Itanium™ family processor architecture.

The University of Illinois IMPACT group's register connect scheme has a number of drawbacks. The number of newly available registers is restricted by the amount of encoding space available to specify the connection between the old names and the new registers. Further, no matter the style of processor implementation (in-order, superpipelined, out-of-order, any of the methods with or without register renaming etc.), one level of indirection is always required when accessing the register connected to an old name. Further, the new registers are explicit in the architecture, and are always present in the processor implementation. This drawback implies that the implementations are not allowed to simply support the new registers by a hierarchy of register file(s), backed by special or general storage locations. This possibility exists in the method being described herein.

SUMMARY OF THE PREFERRED EMBODIMENTS

The foregoing and other problems are overcome, and other advantages are realized, in accordance with the presently preferred embodiments of these teachings.

In one aspect the invention provides an improved system and method for computer register management.

In another aspect, the invention provides an improved system and method for making more computer registers available to one or more programmers.

In a further aspect, the invention provides for the facilitation of architectural features which overload or extend the architected register namespace and ease the overhead of register management.

An additional aspect of the inventions provides for the addition of more computer registers without changing the instruction format of the computer.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 3 shows a segment of code illustrating conventional spilling and re-filling techniques for a 2 register system;

FIG. 4 shows a segment of code illustrating a situation when a programmer runs out of usable architected registers, according to the present invention;

DETAILED DESCRIPTION OF THE PREFERRED EMBODIMENTS

The description that follows describes the methods of implementation and apparatus which support techniques for register management according to the present invention. The invention is applicable to any computer processor and is suitable for both software-based and hardware-based embodiments. Further it is also applicable to uniprocessor systems, multiprocessor systems, and virtual machine implementations of processor architectures.

Figure 1:
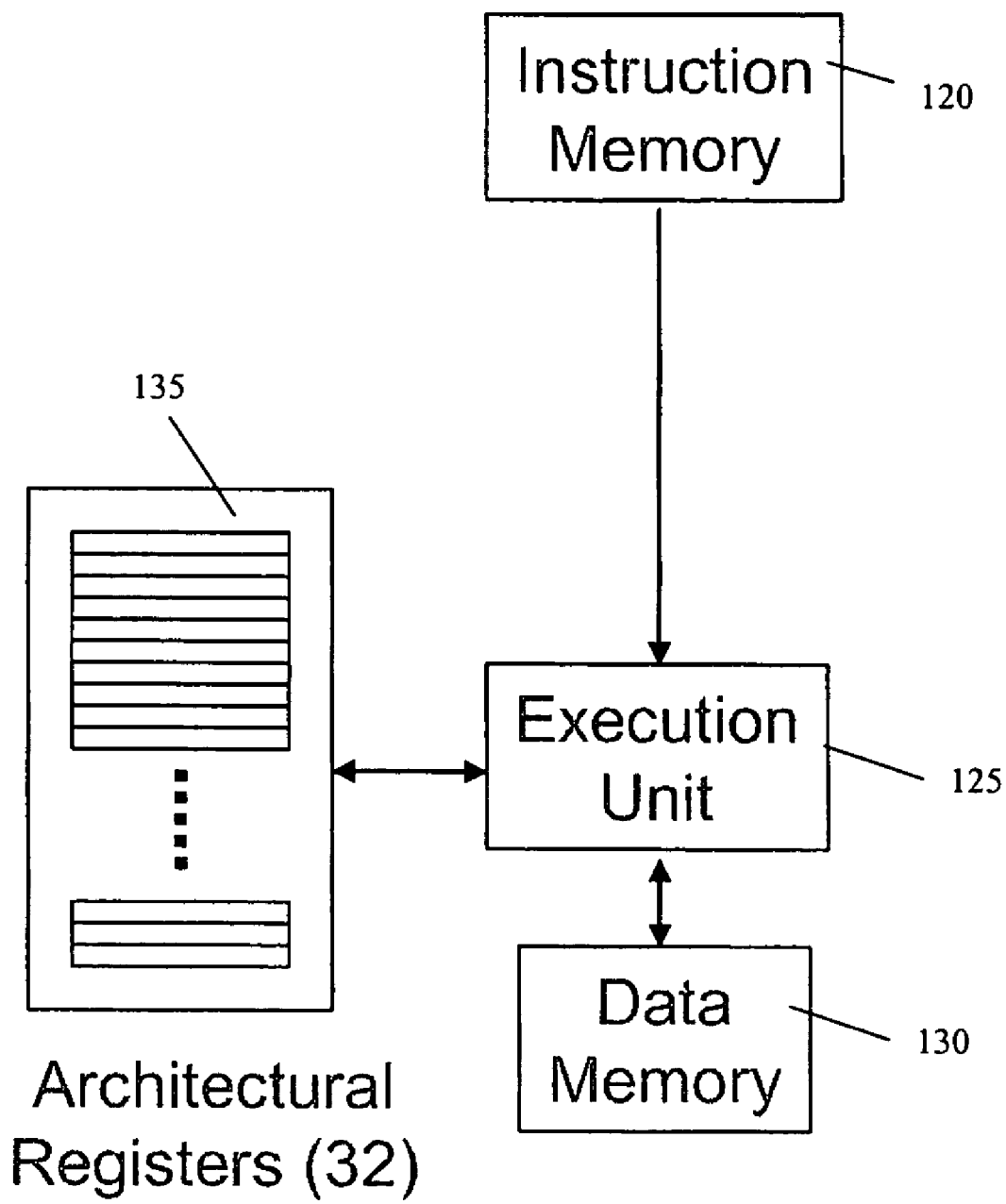
FIG. 1 is a flow diagram describing the conventional execution of instructions without performing renaming of register operations.
Figure 2:
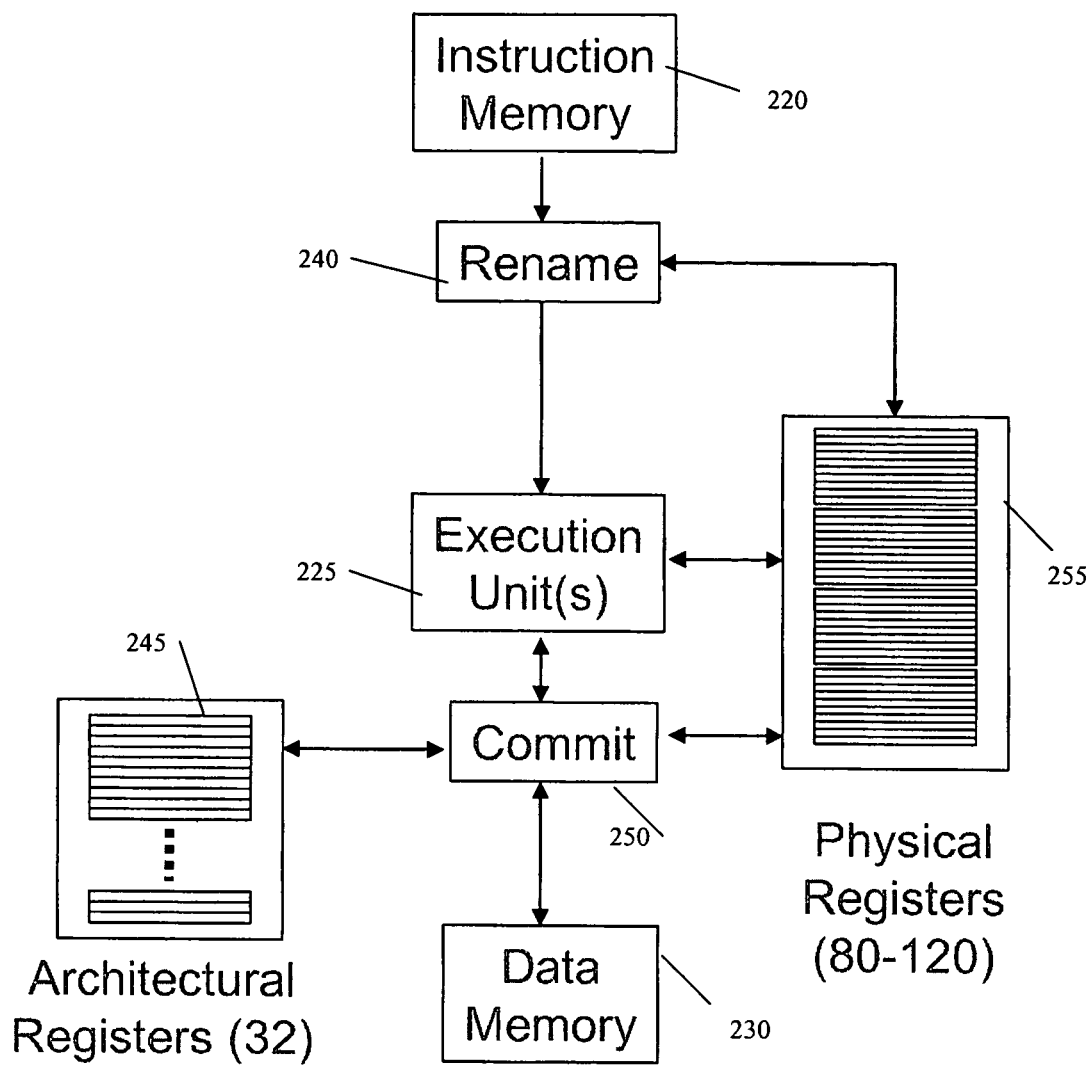
FIG. 2 is a flow diagram showing conventional internal system organization where register output values can be renamed to avoid problems of anti-dependence and output-dependence, and register input values can be renamed to reflect the new names of output registers so that correct pure data dependence are guaranteed.
Figure 5:
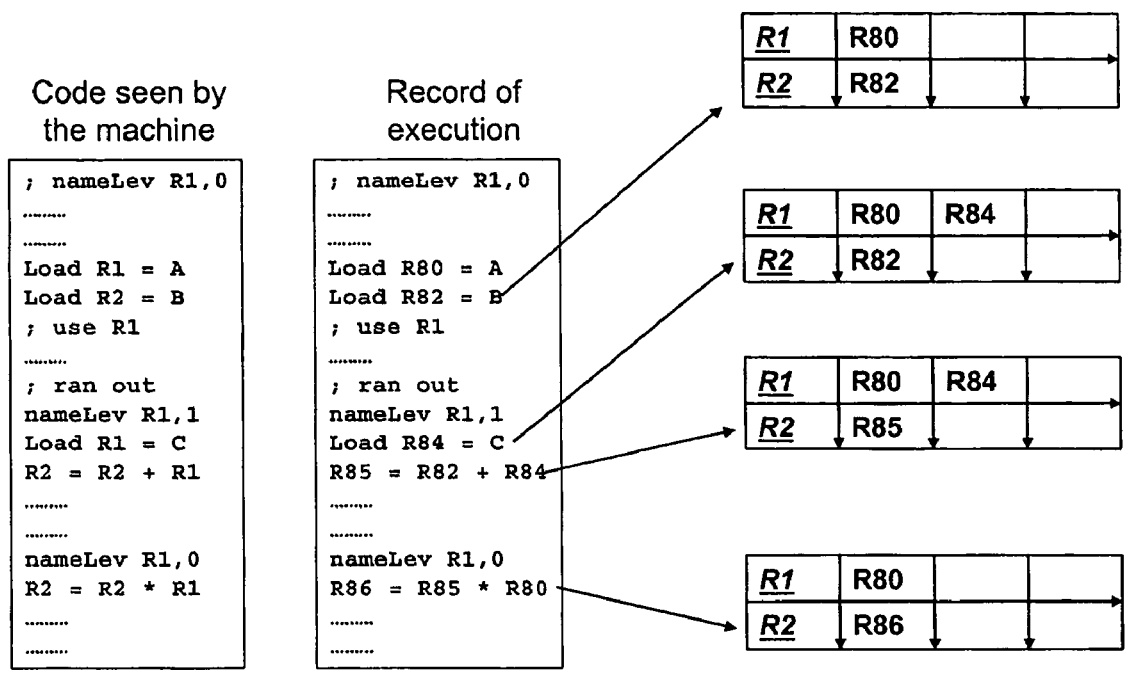
FIG. 5 is a functional block diagram illustrating a portion of the inside of a computer processor during the execution of the instruction set of FIG. 4.

The invention disclosed herein presents a new method of reducing the overhead of register management. One embodiment of the invention introduces a concept of a name level for each of the named architected registers in the processor. When the machine begins execution, each of the register names has the level of "0" associated with it. The invention introduces a new instruction called "nameLev", which allows the programmer to change the "current" name level of a register name. Referring to FIG. 4, which shows an example of when a programmer runs out of usable registers after the use of R1. In this case, the programmer simply inserts the following nameLev instruction:

nameLev R1, 1 which associates the new name level of '1' with the architected register name R1. From that point on until the programmer changes the name level of R1 back to "0", a new register named R1 will be available for use. The program follows and uses the new R1, as needed. When the new R1 is no longer required or the "old" register R1 must be used, the programmer inserts the instruction:

nameLev R1, 0 at that point in the program. From that point on, when a program instruction uses the name R1, it refers to R1 at name level 0. FIG. 5 shows what happens inside the processor when the example instruction sequence is presented for execution. When execution of this piece of code begins, the LOAD R1 instruction creates an internal name for R1 as R80. At the first use of R1, internal register R80 is used to supply the desired value in R1. An instruction then executes that requires an architected register name, but all names (in this 2-register machine example) are taken. The programmer then inserts the nameLev R1, 1 instruction. The nameLev instance informs the machine that the programmer intends to use a new internal register for R1. The machine uses its internal name management method (in an out-of-order with renaming processor, a rename map table), to remember the change. The next time an instruction uses the name R1 as one of its source registers, the newly remembered internal register is used to supply the source operand for that instruction. On the other hand, if and when an instruction writes its results into R1 (not shown in this example), the results are written to a new physical register assigned by the hardware in the normal course of execution.

To summarize, an extra named register was made available to the programmer on demand and when the use of the extra register was no longer needed, it was taken out of use. The method used the exact same encoding of instructions as in FIG. 3, with the only additional overhead being imposed was that of the two extra instructions. The process of mapping the new name levels to internal resources was completely managed by the processor implementation and is completely hidden from the programmer. Thus, the original goal of an architectural specification, which allows the programmer complete independence from the machine implementation while guaranteeing the correctness of program execution, is achieved. This method completely frees the programmer from having to study and analyze different trade-offs when spilling and re-filling registers. The method makes the task of register allocation, assignment, spilling, and re-filling completely redundant as the programmer is provided with a large number of name levels for the registers that he wishes to use.

Figure 6:
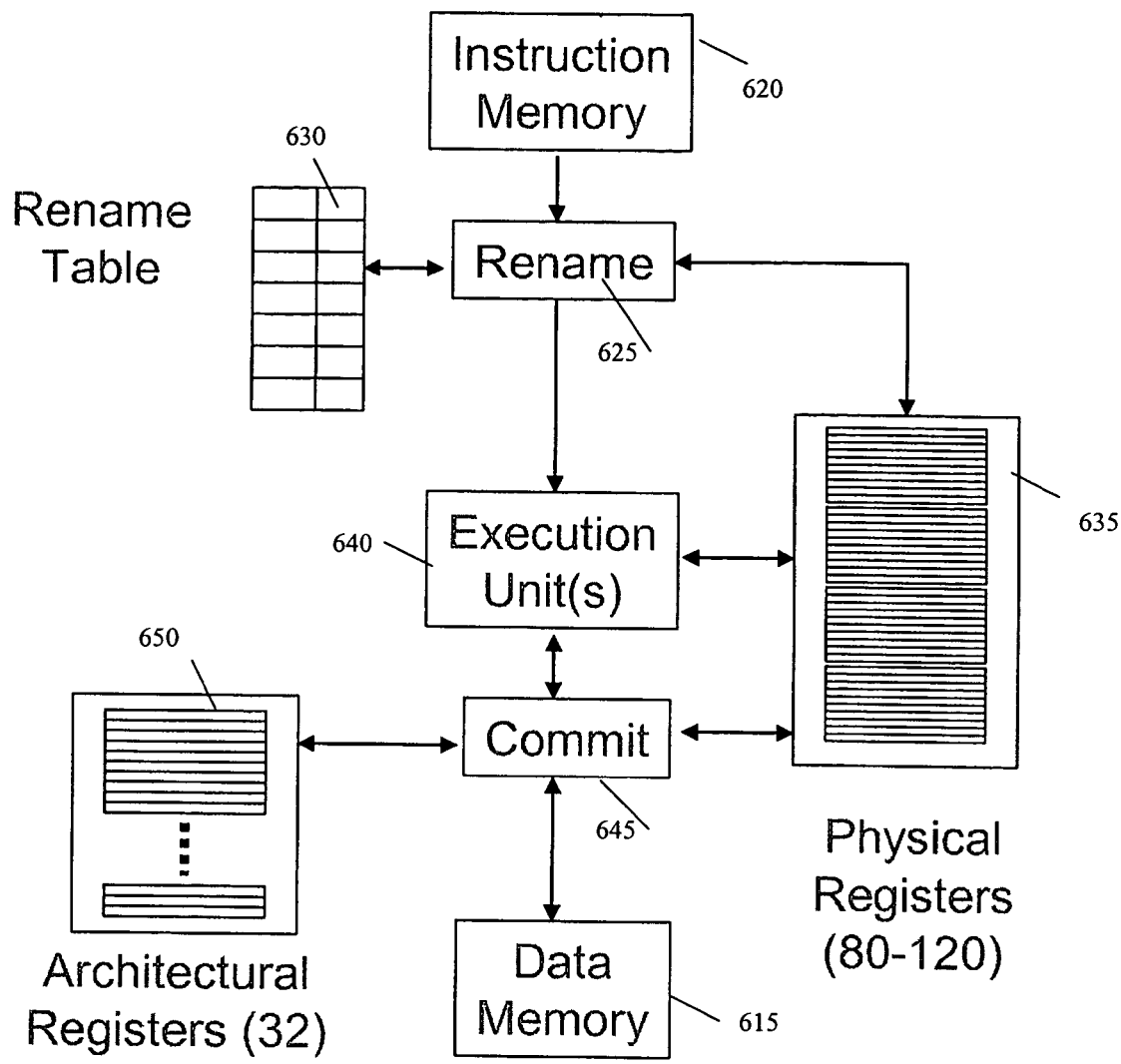
FIG. 6 is a functional block diagram showing a partial view of an implementation of a conventional out-of-order processor.
Figure 7:
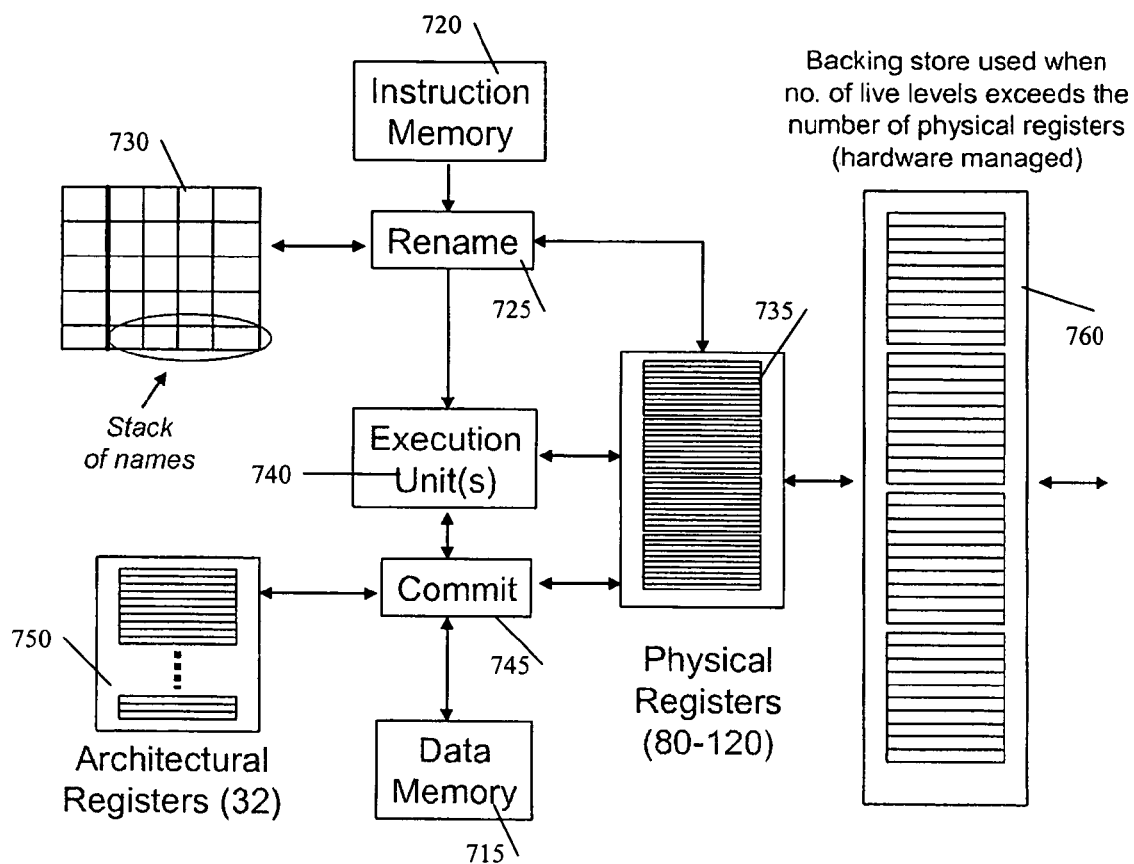
FIG. 7 is a functional block diagram showing a partial view of an implementation of a modified out-of-order processor according to the present invention with hardware-based implementation of levels of register names.

Before discussing a presently preferred embodiment for this invention with respect to FIG. 7, it will be instructive to first review the system shown in FIG. 6. FIG. 6 shows a partial view of an implementation of an out-of-order superscalar processor. In this figure, the processor does not include the implementation of the present invention. There is an instruction memory 620 where program instructions reside. The next instruction is fetched from the instruction memory and is brought into the processor. After the instruction is decoded, the destination register operand (if there is one), is renamed 625 using the normal register renaming process. As a result, the architected destination register name is mapped to a physical (i.e. internal, non-architected) register name in the "rename table" 630. A lookup is conducted in the rename table 630 for each of the source register operands specified by this instruction. If a source register name is found to have been mapped to a physical register 635, then the value in the physical register is supplied to the execution unit 640 when the instruction goes there for execution. After the instruction has been executed, the result is written to the physical register 635 now being called the name of the destination register operand specified in the instruction. After the instruction completes execution, the instruction enters the commit part 645 of the processor and the state is copied to the architected processor state in exactly the order in which the original program specified their execution. At this time, the processor copies (when necessary, overwrites) the results of the instruction from the physical register 635 being called the architected register names, to the actual architectural register 650 of the name. The actual architected register file does not participate in the execution of the instruction, and is used merely as a holding place for a precise architected machine state.

This invention can be implemented using many different techniques. For example, FIG. 7 shows a processor according to the presently preferred embodiment of the invention. As shown, and in contrast to FIG. 6, the rename table map 730 has now been modified to hold a large number of names for each architected register name. As instructions appear the same register renaming sequence of events takes place as illustrated in FIG. 6. However, when a nameLev instruction for an architected register 750 appears, the currently assigned physical register 735 in the rename table map 730 is "pushed" down one level, and a new physical register 735 is made available in its place. This is indicated by the stack of names circled 732 around an example entry in the rename table map. The maximum number of levels available to the programmer for a given architected register name is limited only by the size of the stack in the rename table map 730 entry. If the stack is made potentially infinite, there is truly no limit over how many levels the programmer can use for a given architected name. The actual physical register 735 could be a limiting factor, however, the physical registers 735 are backed by possibly multiple levels of the physical register hierarchy 760 and then by special or general memory locations in the system. Thus it is possible to ensure a potentially infinite supply of new registers for the use of the programmer, while keeping the size of the instruction word the same.

Some other potential alternatives present themselves when implementing the present invention. For example, when the implementation is a machine that performs hardware register renaming, the scheme easily lends itself to be an extension of the renaming mechanism itself. The renaming hardware simply maintains a pointer to the "current" physical register for a given architected register, and thus the extra lookup in the rename map table is simplified or bypassed. The pointer itself is managed via the use of the nameLev instruction.

On the other hand, machines that lack the extra hardware renaming logic (e.g., in-order execution processors with no register renaming), may use special hardware physical registers provided for the purpose of the implementation of the present invention. Alternately, a set of register stacks could be used for the same purpose. Yet another alternative may be a hardware managed "register cache" which could be used for this purpose. Yet another alternative may be the use of a special private memory that is hardware managed. Any of the above alternatives could be backed by a partial or full hierarchy of larger and slower memories, finally backed by main storage of the machine.

Some of the advantages of the present invention are as follows. This invention makes more architected registers available to the programmer, via overloading or extending the register namespace dynamically under programmer control. At least as many as the number of physical registers in the processor are available for direct use by the programmer at low access latencies. Any program that uses more registers than that could experience performance penalties, but will still execute as expected by the programmer. In other words, the programmer now has the flexibility to trade-off performance for assured accuracy.

In contradistinction to many of the prior approaches, the present invention achieves the extension of the architected register namespace while keeping the size of the instructions in the original instruction-set unchanged.

The extensions made possible by the present invention are upward code compatible and the user's investment in software may remain intact.

Further, the present invention reduces the power consumption in the processor by reducing the unnecessary traffic to the storage hierarchy, which is necessitated by the spill and re-fill instructions in processors without the present invention.

Further, improved performance of an application on a processor that uses the present invention is achieved by reducing unnecessary spill and re-fill instructions, thereby reducing the burden on the execution pipeline of the processor, the instruction memory hierarchy of the processor, the data memory hierarchy of the processor, and the cache coherence traffic in the system.

Although described in terms of preferred embodiments, it should be realized that a number of modifications of the teachings of this invention may occur to one skilled in the art and will still fall within the scope of this invention. By example, the teachings of this invention are not limited to only those register assignments described herein. Further, while the teachings of this invention described herein are provided with a certain degree of specificity, the present invention could be implemented with either greater or lesser specificity, depending on the needs of the user. Further, some of the features of the present invention could be used to advantage without the corresponding use of other features. As such, the foregoing description should be considered as merely illustrative of the principles of the present invention, and not in limitation thereof.

What is claimed is:

1. A method for managing registers in a processor, comprising:

introducing a name level instruction for at least one of a named architected register into an instruction set, the instruction set for use with the processor;

allowing a programmer to change the current name level of the at least one named architected register via said name level instruction, the at least one named architected register available to the programmer as an additional named architected register as a result of a name level change; and assigning a new physical memory location to the at least one named architected register upon receipt of the name level instruction instituting a name level change for the at least one named architected register.

2. A method as in claim 1, wherein the physical memory location comprises a physical register, the name level instruction initiating hardware register renaming operations performed by hardware register renaming apparatus of the processor.

3. A method as in claim 2, wherein the hardware register renaming apparatus maintains a pointer to a current physical register for the at least one named architected register, where upon receipt of the name level instruction the hardware register renaming apparatus changes the pointer to another physical register for the at least one named architected register with the new name level, thereby assigning a new physical memory location to the at least one named architected register.

4. A method as in claim 1, wherein the processor uses at least one register stack to assign a new physical memory location to the at least one named architected register upon receipt of the name level instruction.

5. A method as in claim 1, wherein the processor uses a hardware-managed register cache to assign a new physical memory location to the at least one named architected register upon receipt of the name level instruction.

6. A method as in claim 1, wherein the processor uses a hardware-managed special-purpose memory to assign a new physical memory location to the at least one named architected register upon receipt of the name level instruction.

7. A method as in claim 1, wherein the processor uses a hardware-managed component of main memory storage of a system to assign a new physical memory location to the at least one named architected register upon receipt of the name level instruction.

8. A method as in claim 1, wherein the processor uses a software-managed component of main memory storage of a system, where upon finding that a name resides in a special purpose area of main storage, an interrupt to the processor causes invocation of an interrupt handler that performs a task of bringing a value of the name level from the main storage to a physical register.

9. A method as in claim 1, wherein the processor uses a hardware-managed hierarchy of structures such as cache and storage, successively larger in size and slower in access time to assign a new physical memory location to the at least one named architected register upon receipt of the name level instruction.

10. A method as in claim 1, wherein the name level instruction provides for the facilitation of architectural features which overload the architected register namespace reducing the overhead of register management.

11. A method as in claim 1, wherein the name level instruction provides for additional architected registers without changing the instruction format of the computer.

12. A computer program product comprising a computer readable memory medium embodying a computer readable program, wherein the computer readable program embodied in the computer readable memory medium causes a computer to perform operations when executed by a computer processor, the operations comprising:
receiving a name level instruction;
changing a current name level of a named architected register in response to the received name level instruction;
adding a new architected register for use by a programmer, the new architected register corresponding to the named architected register with the new name level instituted by the received name level instruction; and
assigning a new physical memory location to the at least one named architected register upon receipt of the name level instruction instituting a name level change for the named architected register.

13. A computer program product as in claim 12, wherein the physical memory location comprises a physical register of the computer processor, the name level instruction initiating hardware register renaming operations performed by hardware register renaming apparatus of the computer processor.

14. A computer program product as in claim 12, wherein the name level instruction provides for the facilitation of architectural features which overload the architected register namespace reducing the overhead of register management.

15. A computer program product as in claim 12, wherein the name level instruction provides for additional computer registers without changing the instruction format of the computer.

16. A data processor comprising:
a memory configured to store a program comprising a plurality of instructions and at least one name level instruction, the name level instruction configured to change a name level of a named architected register when executed;
at least one execution unit configured to execute the program comprising a plurality of instructions and at least one name level instruction;
said data processor further comprising a plurality of registers; and
a register renaming mechanism coupled to a stack of register names and responsive to a name level instruction for assigning a new physical register to the named architected register upon execution of the at least one name level instruction of the program.

17. A data processor as in claim 16, wherein the memory includes a backing store.

18. A data processor as in claim 16, wherein the register renaming mechanism used for hardware register renaming maintains a pointer to a current physical register for a corresponding architected register.

19. A data processor as in claim 16, wherein the name level instruction provides for creating additional computer registers without changing the instruction format of the computer.

20. The method of claim 19 where the physical memory location is an internal register selected by register renaming apparatus of the processor.

21. The method of claim 19 where the physical memory location is a general memory location of a system.

22. A method comprising:
receiving a name level instruction during execution of a program in a processor, the name level instruction changing a name level of a named architected register from an original name level to a new name level, the named architected register with the new name level treated as an additional named architected register;
assigning a new physical memory location to the named architected register upon receipt of the name level instruction, the selection of which new physical memory location to be assigned to the named architected register with the new name level controlled solely by apparatus of the processor;
receiving additional instructions using the named architected register with the new name level;
using the new physical memory location assigned to the named architected register with the new name level during execution of the additional instructions; and
receiving a name level instruction changing the name level of the named architected register back to the original name level, removing the additional named architected register train availability for use.

* * * * *